HYDRODYNAMICALLY AIR LUBRICATED MAGNETIC TAPE HEAD

Filed Dec. 6, 1960 2 Sheets-Sheet 1

*INVENTORS*
HEARD K. BAUMEISTER
VLADIMIR NEJEZCHLEB
*BY* [signature]
ATTORNEY

INVENTORS
HEARD K. BAUMEISTER
VLADIMIR NEJEZCHLEB
BY
ATTORNEY

United States Patent Office 3,170,045

Patented Feb. 16, 1965

3,170,045

HYDRODYNAMICALLY AIR LUBRICATED MAGNETIC TAPE HEAD

Heard K. Baumeister, Rhinebeck, and Vladimir Nejezchleb, Poughkeepsie, N.Y., assignors to International Business Machines Corporation, New York, N.Y., a corporation of New York Filed Dec. 6, 1960, Ser. No. 74,150

18 Claims. (Cl. 179—100.2)

This invention relates to tape feeding systems. In its more particular aspects, the invention relates to method and means for maintaining a constant, thin film of air between a moving tape and its guide and head surfaces, whereby the tape is hydrodynamically air lubricated as it moves over such surfaces. The invention was conceived as an improvement in magnetic tape feeding systems and the description thereof will, therefore, be developed in respect to such systems.

This application is a continuation-in-part of our application, Serial No. 847,762, filed October 21, 1959, now abandoned, for Hydrodynamically Air Lubricated Magnetic Tape Head.

It is the paramount objective of this invention to control the thickness of the air film which is created between stationary tape guiding surfaces, such as a read-write head, and the tape moving thereover so that the tape will operate near the optimum electrical region of the system with a minimum amount of tape and tape guide wear.

When a magnetic tape is fed over a tape reading or writing head, a body of air will collect between the tape and the head surface. Heretofore, the air films so formed have been uncontrolled and have caused the tape to float and flutter as it passed over the head with the result that the signal strength was reduced and the problems arising from skew were aggravated. Means, such as pressure pads designed to hold the tape in contact with the head, and slots cut into the head surface to exhaust all the air were employed to eliminate the air film completely. While eliminating the uncontrolled air film and its attendant disadvantages, these expedients introduced their own problems. When the tape is held in contact with the head such that the air film is eliminated, pronounced head and tape wear result. Furthermore, the frictional build-up of oxide spots which develop on the tape when it is in substantially direct contact with the head gives rise to spurious signals and drops out and increases the noise to signal ratio.

The present invention is predicated on the concept that the air cushion between the tape and the head surface can be used to great advantage if the thickness of the film of the air between the tape and the head surface is controlled and if such film is maintained constant in point of time, thereby providing an air lubricant which preserves both the head and the tape while maintaining a constant space between the tape and the read-write gaps of the head at which maximum signal strength is realized. The parameters involved in the maintenance of a controlled air film between the tape and the head surfaces are: the shape of the head, the velocity of the tape, the tension on the tape, and the angle at which the tape is wrapped about the head.

When the parameters contributing to the air film are varied and measurements of the film thickness are taken, it will be found that the film thickness at different values of tape velocity and tape tension but for a constant cylindrical head radius, is constant in time for an angle of tape wrap about the head.

How to control or define any film for any head can be determined by resort to a mathematical equation which takes into consideration the parameters which are involved. Thus, when the simplified differential equation:

$$H^3\frac{d^3H}{dl^3}=1-H \qquad (1)$$

where:

$$H=\frac{h^*}{h}$$

and $h$=tape to head clearance
$h^*$=some special clearance
$l$=a dimensionless abscissa from lubrication theory is numerically integrated, the tabulated solutions always result in the same constant of integration, i.e., .642. This constant is defined by:

$$C_1=\frac{h^*}{R}\left(\frac{T}{6uV}\right)^{2/3} \qquad (2)$$

where:

$R$=radius of the head
$T$=tension on the tape
$V$=velocity of the tape
$u$=viscosity of the air Hence, all contributing parameters given, $h^*$ can be determined with high accuracy. This figure is shown by comparing experimental and theoretical values of $h^*$ $$\left(\text{i.e.,}\frac{h^*\text{ experimental}}{h^*\text{ theoretical}}=.82\pm.18\right)$$

The existence of Equation 2, therefore, provides a mathematical means for predicting the thickness of the air film for a head of any given radius as a function of the tape tension, velocity, and air viscosity. This suggests ways in which the air film may be controlled and used to advantage. In particular, it suggests a way to reduce tape wear, maintain signal strength, and eliminate skew caused by wandering or "fish tailing" of the tape across the head. This latter phenomenon results from the non-uniform frictional forces between the tape and the head surface which cause the tape to move from side to side as it moves over the head.

Solving Equation 2 for $h^*$, substituting the constant .642 for $C_1$ and providing for a tolerance, the following equation is obtained:

$$h^*=.642R\left(\frac{6uV}{T}\right)^{2/3}\pm20\% \qquad (3)$$

The total angle of wrap about the head, designated at $\theta_T$, may also be expressed mathematically as follows, incorporating the expression for $h^*$:

$$\theta_T=33.7\frac{h^*}{R}\left(\frac{T}{6uV}\right)^{1/3}\pm20\% \qquad (4)$$

The angle of wrap is also typically expressed as the angle on each side of the head, designated as $\theta_a$, as follows:

$$\theta_a=\theta_T/2=16.8\frac{h^*}{R}\left(\frac{T}{6uV}\right)^{1/3}\pm20\% \qquad (5)$$

Equations 3, 4 and 5 thus provide useful relationships for tape-head clearance ($h^*$) and wrap angles ($\theta_T$ and $\theta_a$) as functions of head radius R, tape tension T, tape velocity V and air viscosity $u$.

It is contemplated that the invention may be usefully employed in a great variety of specifically different tape transports. For the purpose of illustration, the invention herein is disclosed as embodied in a tape feed mechanism of the type shown in J. A. Weidenhammer et al. Patent 2,792,217, issued May 14, 1957. The invention will, therefore, be further described with respect to a specific embodiment thereof shown in the drawings forming a part hereof, in which drawings like reference numerals indicate like parts, and:

Figure 1:
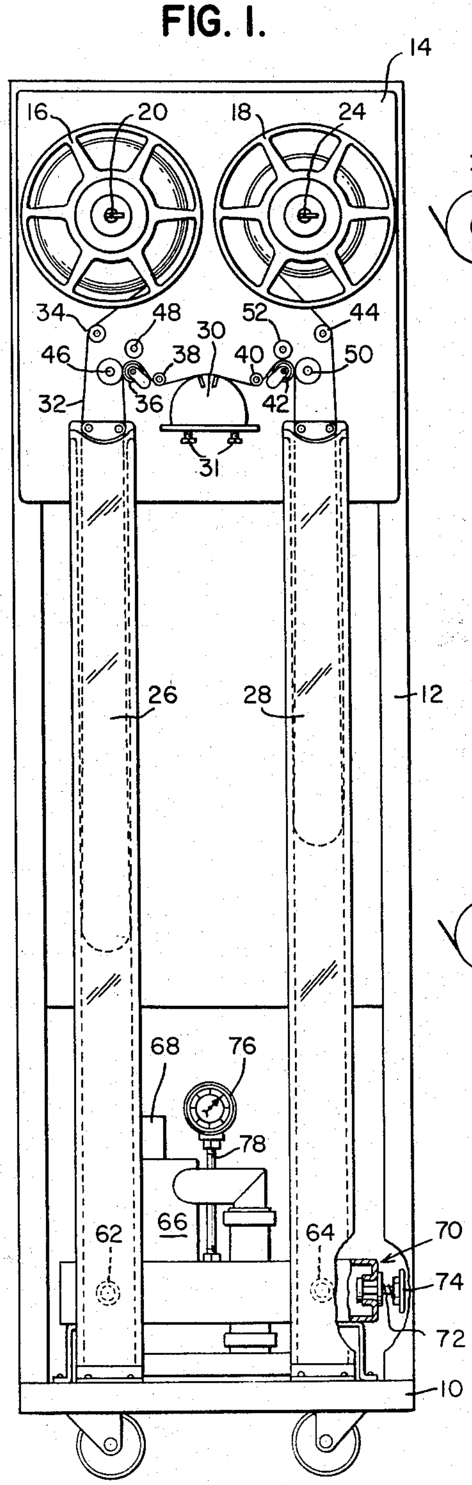
FIG. 1 is a face elevational view of a magnetic tape feeding machine in which the invention is embodied.

The tape transport of FIG. 1 is of the kind generally employed in connection with the input and output of data for computers and data processing systems. The machine provides a base 10, upright supporting structures 12 and a reel panel 14, together forming a supporting structure in which the operative mechanism of the tape processing equipment is mounted. At the face of the reel panel 14 are a pair of magnetic tape reels 16 and 18 mounted for rotation with reel spindles 20 and 22, respectively. Both reels are adapted to be driven in either direction by means of motors operatively connected to the reel spindle drive mechanisms (not shown) mounted at the rear of the reel panel 14.

Extending from the base 10 to the reel panel 14 and located under the respective reels 16 and 18 are a pair of vacuum columns 26 and 28. Each of the columns comprises an enclosure for a tape loop depending from the respective reels, such that a loop of tape depending into either column divides the column into an upper portion open to the atmosphere and a lower portion below the bight of the loops which is substantially sealed from the atmosphere by the tape, all as taught in said Weidenhammer et al. patent.

Mounted on the reel panel 14 is a tape read-write head 30. This head may have a single flux gap or a pair of angularly spaced flux gaps. Whatever the specific construction of the head, its tape guiding surface in which the gaps are formed is substantially cylindrical. The head 30 may be mounted by a pair of screws 31 by means of which it may be adjusted in respect to a pair of adjacent tape guide rollers.

Tape 32 from the reel 16 may be trained about a tape guide roller 34 and looped into the left vacuum column 26 and from the loop in the column, the tape is passed over a pinch roller 36, under a left tape guide 38, over the head 30, under a right tape guide 40, over a second pinch roller 42 and into the right vacuum column 28. From thence the tape is returned over a tape guide 44 and to the reel 18. The rotation of the reels 16 and 18 is automatically controlled to maintain a relatively free hanging loop of tape in each of the columns 26 and 28. Such control, however, forms no part of the present invention but is claimed in James A. Weidenhammer et al. application for United States Patent, Serial No. 535,052, now Patent No. 3,057,568, which has an effective filing date of May 28, 1952.

Associated with the pinch roller 36 at the left of the reel panel is a reverse tape drive capstan 46 and a non-rotating stop capstan 48. Similarly, associated with the pinch roller 42 at the right of the panel is a forward drive capstan 50 and a non-rotary stop capstan 52.

The pinch rollers 36 and 42 are interconnected by a linkage system at the back of the reel panel 14, as shown in the aforesaid Weidenhammer et al. patent, which is effective for the concerted rocking movement of the pinch rollers in the opposite sense such that the tape may be alternately gripped and released by the respective pinch rollers and their related stop and drive capstans for driving it over the read-write head 30 in a selected direction. To this end, the drive capstans 46 and 50 are constantly rotated in opposite directions, such that the reverse drive capstan 46 is rotated in a clockwise direction and the forward drive capstan 50 is rotated in a counterclockwise direction. The pinch rollers 36 and 42 are also adapted to move the tape into contact with their respective stop capstans 48 and 52 when a tape feeding operation is terminated.

The vacuum columns 26 and 28 derive their name from the fact that mechanism is provided for normally maintaining a rarefied atmosphere in the column sections which are sealed off by the bight of the tape loops. Each of the columns communicates with a surge tank 60. Thus, the left vacuum column 26 is connected to the surge tank by means of a conduit 62 and the right vacuum column 28 is connected to the surge tank by a conduit 64. A vacuum pump 66 driven by a vacuum pump motor 68 is connected to the surge tank 60 such that a sub-atmospheric condition may be maintained within the surge tank. The height of vacuum maintained within the surge tank 60 can be controlled by adjusting a vacuum relief valve 70. As shown in FIG. 1, the vacuum relief valve normally tends to close a vent passage in the surge tank 60 since it is biased into a closed position by a spring 72. The tension of the spring 72 can be altered by adjusting a thumb nut 74, such that a predetermined vacuum can be established and maintained in the surge tank 60. The level of the vacuum in the surge tank 60 is indicated by vacuum gauge 76 connected thereto through a conduit 78.

In normal operation, the valve 70 is set to relieve a predetermined pressure differential. Any change in leakage flow through the vacuum columns 26 and 28 will not cause a change in the vacuum level, because the latter change will, in turn, cause a compensating change in the flow rate through the vacuum relief valve 70. The net effect is such that the vacuum in the surge tank is maintained at a relatively constant value. Therefore, the vacuum level in the column can be kept at a relatively constant level with variable leakage flow rate through the columns. Any high frequency vacuum level fluctuations caused by rapid movement of the tape loops within the vacuum columns are absorbed by the surge tank 60.

Figure 2:
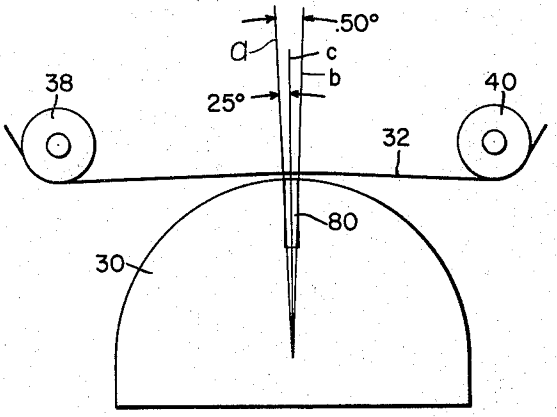
FIG. 2 is a geometric representation of the relation between a magnetic tape and a head having a flux gap over which the tape is fed under control of suitable tape guide surfaces, the angle of wrap therein illustrated being at or near the minimum, and the representation of the angular relationship being exaggerated in the interest of clarity.

It has been stated heretofore that the air film between a cylindrical head and an overlying tape is constant in time for an angle of tape wrap about the head. This relationship is shown in FIG. 2, wherein a head 30 has a single flux gap 80 formed at the vertical radius. If the tape guides 38 and 40 are so located in respect to the cylindrical surface of the head 30, that the angle of tape wrap defined by the radii $a$ and $b$ extends .25 degree to each side of the vertical radius $c$, for example, a constant hydrodynamically formed air film will be formed and maintained in the region of the gap 80. A tape wrap of substantially .25 degree is about the minimum that can be maintained within the limits of present mechanisms.

Figure 3:
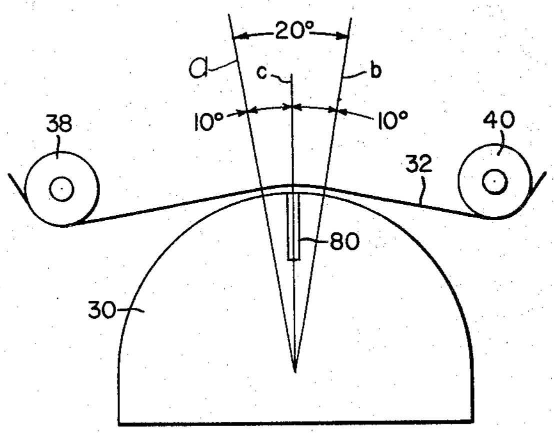
FIG. 3 is a representation similar to that of FIG. 2, showing, however, the angle of wrap therein illustrated being at or near the maximum.

FIG. 3 illustrates what is considered to be the maximum amount of tape wrap from which the substantial advantage herein can be enjoyed, and the tape guides 38 and 40, can, therefore, be positioned in relation to the head 30, having due regard to the head radius, to provide such additional degree of wrap best suited for any given installation. This figure shows a tape wrap of 10 degrees at each side of the gap.

When the angle of tape wrap about the head at either side of the gap is kept as small as possible, marked advantages are realized when starting tape movement, because a minimum amount of time is required to build up the air film under the tape when its angle of wrap is small. For tapes or webs which are fed constantly or with little or no start-stop action, the time required to build up the air film initially is not so important, and, therefore, a greater angle of wrap may be employed to good advantage. In any event, the advantages of the invention are realized when the total angle of wrap about the guide surfaces is not substantially less than .50 degree and not substantially more than 20 degrees.

Figure 4:
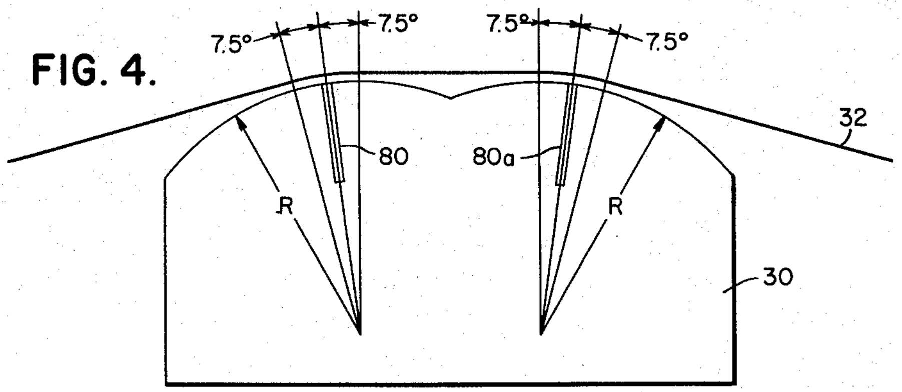
FIG. 4 is a geometric representation of the relation between a magnetic tape and a modified form of head having a pair of spaced flux gaps.
Figure 5:
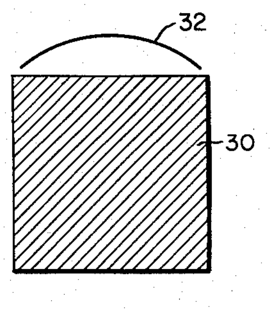
FIG. 5 is a diagrammatic cross-sectional view through a head and an overlying tape.
Figure 6:
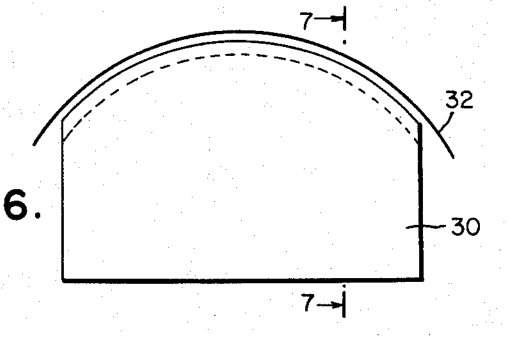
FIG. 6 is a diagrammatic front elevational view of a modified head which has been circumferentially grooved to aid in the control of the air film in the lateral direction.
Figure 7:
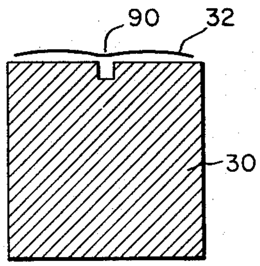
FIG. 7 is a diagrammatic view taken on line 7—7 of FIG. 6.

When the distance between the gaps of a two gap head must be great, or the tape velocity low, or the tape tension high, the leakage of air at the lateral edges of the head may reduce the thickness of the air film between the tape and the head at the trailing end of the film such that contact between the tape and the head at such trailing end may result. This difficulty may be avoided by resort to a head structure such as that shown in FIG. 4 which is so formed as to permit regeneration of the air film over the second or trailing gap. Whereas the head of FIG. 2 is formed on a single radius, the head of FIG. 4 has an effective surface on two radii such that a small gap in the order of .001 of an inch or somewhat more exists between the junction of the two radial surfaces and a line tangent to the surfaces. With the gap 80 located in one of the radial faces and the gap 80*a* located in the other radial face, the clearance formed between the tape and the head surface at the junction of the two radial surfaces will provide an inlet through which the air comprising the lubricating film is supplemented and by which the constant thickness of the film of air over the trailing gap is maintained. FIG. 4, by way of example, shows an operative structure in which an intermediate amount of tape wrap of 7.5 degrees is employed at each side of the two gaps.

The dissipation of the air film at the lateral edges of the head 30 may also result in an air film across the width of the head which is of less thickness at the lateral head edges than the thickness thereof along its medial line, such that a material difference in head to tape spacing results across the tape. This difference in head to tape spacing between the inside and outside tracks of the tape should be minimized if a uniform signal strength is to be obtained from all tape tracks.

It is contemplated that the difference in head to tape spacing along the width of the tape may be reduced by introducing one or more circumferential slots 90 which, in effect, create two or more smaller air bearings. It is contemplated that more than one slot may be employed in wide heads and that the number of such slots will be determined by the width of the head and the tape. It has heretofore been proposed to utilize circumferential slots in magnetic tape read-write heads for the purpose of eliminating as completely as possible all air entrained between the tape and the head. The slots 90 herein are proposed not for the purpose of eliminating the air between the tape and the head, as in the prior art, but for maintaining a better average head to tape spacing across the width of the head.

In one installation, similar to that described above and in which suitable operating conditions were produced, the head 30, as shown in FIG. 4, had radii of .8 of an inch, the tape was driven at a velocity of 112.5 inches per second, the tape was maintained under a tension equivalent to 16 inches of water vacuum in the columns, the angle of wrap of tape about the head was 3 degrees and the head to tape spacing produced was less than .0001 inch.

It is contemplated that the constancy and thickness of the air film between the tape and the head can be achieved by suitably varying any one or several of the parameters that determine the condition. From the foregoing description, it can be seen, however, that once the head has been fabricated and installed in the reel panel 14, unless adjustably mounted, and the tape guides 38 and 40 are mounted in the panel, that the parameters represented by these elements become fixed.

Most magnetic tape data input and output equipment is furthermore designed to operate at a given tape velocity such that for all practical purposes the velocity of the tape may also be considered as fixed. This leaves the tension under which the tape is maintained as the factor which can be adjusted most readily to regulate the thickness of the final air film. Resort to the above discussed equation, head radius, tape velocity and angle of wrap being known, provides means for determining the tape tension in terms of vacuum level to achieve the optimum tape spacing which ordinarily should be held within .0001 of an inch. Having determined the tape tension necessary for maintaining the air film thickness desired, the nut 74 will be adjusted until the vacuum gauge 76 indicates the requisite level of vacuum in the surge tank 60 for a constant motor speed.

It is also contemplated that the vacuum level can be maintained by varying the speed of the vacuum pump motor 68. For most applications, however, this method is not considered as convenient as the one described.

Resort to the vacuum columns 26 and 28 for maintaining the desired tape tension has proven practical in actual operation. It is recognized, however, that the invention is applicable to specifically different tape transport mechanisms where tape tension may be controlled otherwise. For example, it is common to maintain tape loops between the tape reels 16 and 18 and the read-write head 30 for the purpose of isolating the inertia of the reels from the capstan drive mechanism by means of pivoted spring loaded levers which permit the lengthening and shortening of the loops as the demand for tape at the read-write head varies. The biasing springs used in connection with such levers can be adjusted to increase or decrease the tape tension with equally satisfactory results.

The invention has been described herein in connection with a magnetic tape, but the benefits of the invention can be enjoyed when using other tapes including, but not limited to, paper tape and photographic film.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

What is claimed is:

1. In a tape transport adapted to process therein a tape, a tape processing head having a curved surface, said head having a tape processing zone at a point on the surface thereof, a tape in said transport, tape guide means adapted to maintain an angle of wrap of said tape about said curved surface which is within the range of .25°–10° at opposite sides of said processing zone, means for feeding said tape over the curved surface of said head past said processing zone at a sufficiently high velocity tc draw in enough air to urge said tape from the surface of said head, and means for applying a tension to said tape while said tape is being fed so as to urge said tape toward the surface of the head and to maintain an air film of substantially constant thickness between the tape and the surface of the head.

2. In a tape transport adapted to process therein a tape, a tape processing head having a curved surface, said head having a tape processing zone at a point on the surface thereof, at least one circumferential groove in said curved surface, a tape in said transport, means for feeding said tape over the curved surface of said head past said processing zone at a sufficiently high velocity to draw in enough air to urge said tape from the surface of said head, and means for applying a tension to said tape while said tape is being fed so as to urge said tape toward the surface of the head and to maintain an air film of substantially constant thickness between the tape and the surface of the head.

3. In at least one tape transport adapted to process therein a tape, a tape processing head having a curved surface, said head having a tape processing zone at a point on the surface thereof, a circumferential groove in said curved surface, a tape in said transport, tape guide means adapted to maintain an angle of wrap of said tape about said curved surface which is within the range of .25°–10° at opposite sides of said processing zone, means for feeding said tape over the curved surface of said head past said processing zone at a sufficiently high velocity to draw in enough air to urge said tape from the surface of said head, and means for applying a tension to said tape while said tape is being fed so as to urge said tape toward the surface of the head and to maintain an air film of substantially constant thickness between the tape and the surface of the head.

4. In a tape transport adapted to process therein tape, a tape processing head having a generally cylindrical surface, a tape processing zone in said surface of said head, guide means for training a tape about said surface of said head within the range of .25°–10° on either side of said zone, means for feeding a tape in contact with said guide means and about said surface of said head at a sufficiently high velocity to draw in enough air to urge a tape so driven from said surface of said head, and means for applying a tension to a tape so fed of a value not substantially less than that required to hold such tape substantially against said surface of said head so as to form a thin air film of substantially constant thickness between such tape and said head surface and which extends over said zone and to either side thereof.

5. In a tape transport adapted to process therein tape, a tape processing head having a generally cylindrical surface, a tape processing zone in said surface of said head, guide means for training a tape about said surface of said head not to exceed 10 degrees on either side of said zone, a circumferential groove in said generally cylindrical surface, means for feeding a tape in contact with said guide means and about said surface of said head at a sufficiently high velocity to draw in enough air to urge a tape so driven from said surface of said head, and means for applying a tension to a tape so fed of a value not substantially less than that required to hold such tape substantially against said surface of said head so as to form a thin air film of substantially constant thickness between such tape and said head surface and which extends over said zone and to either side thereof.

6. In a tape transport adapted to process therein tape, a tape processing head having a generally cylindrical surface, a tape processing zone in said surface of said head, guide means for training a tape about said surface of said head not to exceed 10 degrees on either side of said zone, a plurality of circumferential grooves in said generally cylindrical surface, means for feeding a tape in contact with said guide means and about said surface of said head at a sufficiently high velocity to draw in enough air to urge a tape so driven from said surface of said head, and means for applying a tension to a tape so fed of a value not substantially less than that required to hold such tape substantially against said surface of said head so as to form a thin air film of substantially constant thickness between such tape and said head surface and which extends over said zone and to either side thereof.

7. In a tape transport adapted to process therein tape, a tape processing head having a generally cylindrical surface, a tape processing zone in said surface of said head, guide means for training a tape about said surface of said head not to exceed 10 degrees on either side of said zone, means for feeding a tape in contact with said guide means and about said surface of said head at a sufficiently high velocity to draw in enough air to urge a tape so driven from said surface of said head, and means for applying a tension to a tape so fed of a value not substantially less than that required to hold such tape substantially against said surface of said head so as to form a thin air film of substantially constant thickness between such tape and said head surface and which extends over said zone and to either side thereof.

8. In a tape transport adapted to process therein a tape, a tape processing head having a generally cylindrical surface, a tape processing zone in said surface of said head, guide means for training a tape about said surface of said head not to exceed 10 degrees on either side of said zone, means for feeding a tape in contact with said guide means and about said surface of said head at a sufficiently high velocity to draw in enough air to urge a tape so driven from said surface of said head, and adjustable means for applying a predetermined tension to a tape so fed of a value not substantially less than that required to hold such tape substantially against said surface of said head so as to form a thin air film of substantially constant thickness between such tape and said head surface and which extends over said zone and to either side thereof.

9. In a tape transport adapted to process therein a tape, a tape processing head having a generally cylindrical surface, a tape processing zone in said surface of said head, guide means for training a tape about said surface of said head not to exceed 10 degrees on either side of said zone, adjustable mounting means for said head whereby said surface of said head may be moved toward or away from a line between the guide surfaces of said guide means, means for feeding a tape in contact with said guide means and about said surface of said head at a sufficiently high velocity to draw in enough air to urge a tape so driven from said surface of said head, and means for applying a tension to a tape so fed of a value not substantially less than that required to hold such tape substantially against said surface of said head so as to form a thin air film of substantially constant thickness between such tape and said head surface and which extends over said zone and to either side thereof.

10. In a tape transport adapted to process therein a tape, a tape processing head having a generally cylindrical surface, a tape processing zone in said surface of said head, guide means for training a tape about said surface of said head not to exceed 10 degrees on either side of said zone, means for feeding a tape in contact with said guide means and about said surface of said head at a sufficiently high velocity to draw in enough air to urge a tape so driven from said surface of said head, and vacuum means for applying a tension to a tape so fed of a value not substantially less than that required to hold such tape substantially against said surface of said head so as to form a thin air film of substantially constant thickness between such tape and said head surface and which extends over said zone and to either side thereof.

11. In a tape transport adapted to process therein a tape, a tape processing head having a generally cylindrical surface, a tape processing zone in said surface of said head, guide means for training a tape about said surface of said head not to exceed 10 degrees on either side of said zone, means for feeding a tape in contact with said guide means and about said surface of said head at a sufficiently high velocity to draw in enough air to urge a tape so driven from said surface of said head, and adjustable vacuum means for applying a predetermined tension to a tape so fed of a value not substantially less than that required to hold such tape substantially against said surface of said head so as to form a thin air film of substantially constant thickness between such tape and said head surface and which extends over said zone and to either side thereof.

12. In a tape transport adapted to process therein a tape, a tape processing head having a generally cylindrical surface, a tape processing zone in said surface of said head, guide means for training a tape about said surface of said head not to exceed 10 degrees on either side of said zone, adjustable mounting means for said head whereby said surface of said head may be moved toward and away from a line between the guide surfaces of said guide means, means for feeding a tape in contact with said guide means and about said surface of said head at a sufficiently high velocity to draw in enough air to urge a tape so driven from said surface of said head, and vacuum means for applying a tension to a tape so fed of a value not substantially less than that required to hold such tape substantially against said surface of said head so as to form a thin air film of substantially constant thickness between such tape and said head surface and which extends over said zone and to either side thereof.

13. In a tape transport adapted to process therein a tape, a tape processing head having a curved surface, said head having a tape processing zone at a point on the surface thereof, a tape in said transport, means for feeding said tape over the curved surface of said head past said processing zone at a sufficiently high velocity to draw in enough air to urge said tape from the surface of said head, and means for applying a tension to said tape while said tape is being fed so as to urge said tape toward the surface of the head and to maintain an air film of substantially constant thickness between the tape and the surface of the head.

14. In a tape transport for moving a tape through a fluid medium of a viscosity $u$, a tape processing head having a curved surface radius R, said head having a tape processing zone at a point on the surface thereof, a tape in said transport, means for feeding said tape at velocity V, means providing a path for said tape so as to be wrapped around the curved surface of the head at each side of the zone, and means for applying a tension T to said tape while it is being fed, when it is fed said tape having a clearance $h^*$ over the zone:

$$h^* = .642R\left(\frac{6uV}{T}\right)^{2/3} \pm 20\%$$

15. In a tape transport for moving a tape through a fluid medium of a viscosity $u$, a tape processing head having a curved surface of radius R, said head having a tape processing zone at a point on the surface thereof, a tape in said transport, means for feeding said tape at velocity V, means providing a path for said tape so as to be wrapped a total angle $\theta_T$ in the range defined by $$\theta_T = 33.7\,\frac{h^*}{R}\left(\frac{T}{6uV}\right)^{1/3} \pm 20\%$$

on the surface of the head around each side of the said zone, and means for applying a tension T to said tape while it is being fed, when it is fed said tape having a clearance $h^*$ over said zone:

$$h^* = .642R\left(\frac{6uV}{T}\right)^{2/3} \pm 20\%$$

16. In a tape transport for moving a tape through a fluid medium of a viscosity $u$, a tape processing head having a curved surface radius R, said head having a tape processing zone at a point on the surface thereof, a tape in said transport, means for feeding said tape at velocity V, means providing a path for said tape so as to be wrapped around each side of said zone, means for applying a tension T to said tape while it is being fed, when it is fed said tape having a clearance $h^*$ over said zone:

$$h^* = .642R\left(\frac{6uV}{T}\right)^{2/3} \pm 20\%$$

and means for producing a constant clearance $h^*$ for an angle $\theta_a$ on each side of the zone by providing a path for said tape to be wrapped an angle $\theta_a$ in the range defined by:

$$\theta_a = \frac{\theta_T}{2} = 16.8\,\frac{h^*}{R}\left(\frac{T}{6uV}\right)^{1/3} \pm 20\%$$

around each side of the zone, where $\theta_T$ is the total angle of wrap around the zone.

17. A magnetic tape transport system adapted to maintain a fluid film of constant dimensions between a moving tape and a head structure comprising:

a head structure surrounded by a fluid medium and having an outer surface portion of a predetermined curvature;

means for guiding a tape for movement in parallel across the curved portion of said head structure;

means for moving a tape across said surface portion of said head structure, in cooperation with said guiding means, at a predetermined velocity sufficient to form a fluid film between the tape and the head structure; and means for applying a predetermined tension to a tape moving under the control of said moving and guiding means to maintain the thickness of said film substantially constant over a predetermined length of said curved portion of said head structure during guided movement of said tape at said predetermined velocity.

18. A magnetic tape transport system adapted to maintain a fluid film of constant thickness between a moving tape and a head structure comprising:

a head structure surrounded by a fluid medium and having pole pieces separated by a non-magnetic gap, the outer surfaces of said pole pieces having lengthwise extending portions of predetermined arcuate shape in the vicinity of said gap; and means for guiding a tape across said head structure through a path extending parallel to said arcuately shaped outer surface portions, at a predetermined velocity and with a predetermined tension sufficient to maintain a fluid film of substantially constant thickness between said tape and said outer surface portions during guided movement of said tape at said predetermined velocity.

References Cited by the Examiner

UNITED STATES PATENTS

| | | | |
|---|---|---|---|
| 2,708,693 | 5/55 | Hendrickson | 179—100.2 |
| 2,957,051 | 10/60 | Epstein et al. | 340—174.1 |

FOREIGN PATENTS

| | | |
|---|---|---|
| 1,163,105 | 9/58 | France. |

IRVING L. SRAGOW, *Primary Examiner.*

STEPHEN W. CAPELLI, *Examiner.*

UNITED STATES PATENT OFFICE
CERTIFICATE OF CORRECTION

Patent No. 3,170,045 February 16, 1965

Heard K. Baumeister et al.

It is hereby certified that error appears in the above numbered patent requiring correction and that the said Letters Patent should read as corrected below.

Column 2, line 48, for "at" read -- as --; column 4, line 46, for "column" read -- columns --; column 7, line 4, for "at least one" read -- a --; same column 7, line 7, for "a" read -- at least one --.

Signed and sealed this 3rd day of August 1965.

(SEAL)
Attest:

ERNEST W. SWIDER
Attesting Officer

EDWARD J. BRENNER
Commissioner of Patents